United States Patent [19]

Kavli et al.

[11] 4,329,732
[45] May 11, 1982

[54] PRECISION CAPACITANCE TRANSDUCER

[75] Inventors: Fred Kavli, Woodland Hills; Kyong Park; John J. Affel, both of Chatsworth, all of Calif.

[73] Assignee: Kavlico Corporation, Chatsworth, Calif.

[21] Appl. No.: 130,695

[22] Filed: Mar. 17, 1980

[51] Int. Cl.³ .............................................. H01G 7/00
[52] U.S. Cl. ..................................... 361/283; 73/718; 361/399
[58] Field of Search .................. 361/283, 399; 73/718, 73/724

[56] References Cited

U.S. PATENT DOCUMENTS

| | | | |
|---|---|---|---|
| 2,751,530 | 6/1956 | Armstrong | 361/283 |
| 2,808,545 | 10/1957 | Hirtreiter | 361/283 |
| 4,064,550 | 12/1977 | Dias | 361/283 |
| 4,128,006 | 12/1978 | Grabow | 73/424 |
| 4,168,518 | 9/1979 | Lee | 361/283 |
| 4,184,189 | 1/1980 | Davis | 361/283 |
| 4,207,604 | 6/1980 | Bezl | 361/283 |
| 4,238,662 | 12/1980 | Lao | 361/283 X |

FOREIGN PATENT DOCUMENTS 350389 3/1937 Italy ..................................... 361/301

Primary Examiner—Elliot A. Goldberg
Attorney, Agent, or Firm—Poms, Smith, Lande & Rose

[57] ABSTRACT

Two square plates of ordinary inexpensive soda lime glass are spaced apart from one another, and are sealed together by a ring of glass frit, with the two plates overlying one another, but with the corners of the two plates displaced so that the corners of each of the two plates extend past the sides of the other plates. The plates may be spaced apart by a small distance, for example, from about ½ to several thousandths of an inch, and thin conductive layers on the two facing surfaces form a variable capacitor which changes in capacitance when pressure is applied to the outside of the two plates. Connections for the conductive plates extend out to the corners of the plates beyond the sides of the other plate to permit easy access. Electrical connections are made through the use of elongated conductive rubber elements. Silicone rubber gaskets and suitable plastic housing members including electrical shielding are employed to mount the capacitive transducer and its associated output hybrid electronic circuit which assembly may be mounted on a ceramic substrate.

11 Claims, 11 Drawing Figures

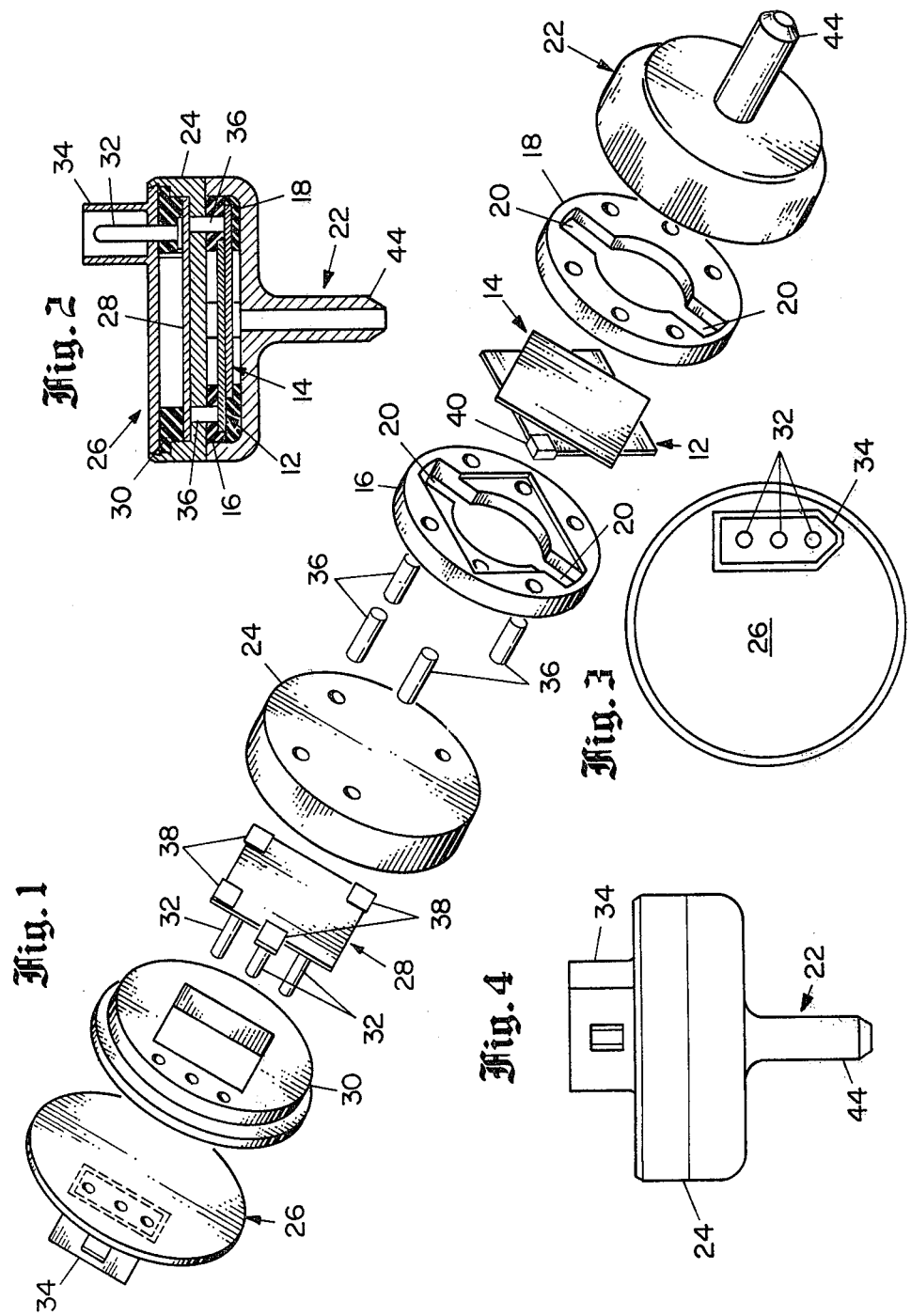

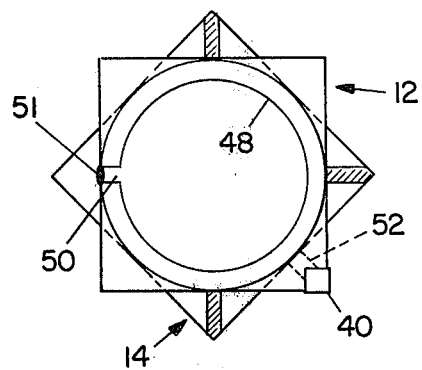
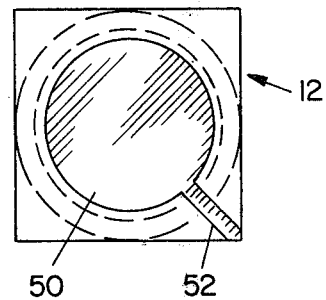
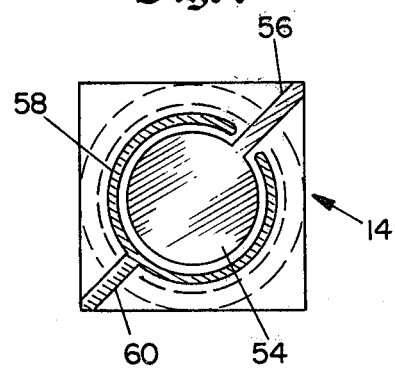
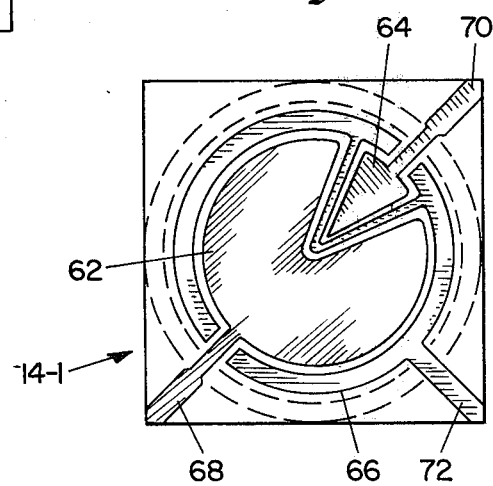

PRECISION CAPACITANCE TRANSDUCER

FIELD OF THE INVENTION

This invention relates to precision capacitive pressure transducers, and more particularly to such transducers which may be made very economically in large quantity runs.

BACKGROUND OF THE INVENTION

Reference is initially made to an article entitled "First Production Automotive Capacitive Pressure Sensor" by Gary M. Marks et al which appeared on pages 114 through 117 of the June 1978 issue of Measurements and Control, which describes a transducer pioneered by the assignee of the present invention. The capacitive pressure sensor described in the foregoing article was composed of an alumina (aluminum oxide) diaphragm bonded to a thicker alumina substrate. Both the diaphragm and substrate were circular, and they were bonded together and spaced apart by glass frit, so that the screened conductive layers on their facing surfaces were located in the order of one thousand to a few thousandths of an inch apart. A metal casing was provided to give electrical shielding, and the entire unit was mounted in a plastic housing. The unit has unusually linear response to variations in pressure, and good stability over a wide range of operating temperatures. However, with the demand for increasing numbers of the pressure sensors for use in the more carefully controlled combustion within automobile engines, the cost of each unit is critical and must be minimized.

Accordingly, a principal object of the present invention is to simplify and reduce the cost of pressure sensitive capacitive transducers without sacrificing any precision or reliability.

SUMMARY OF THE INVENTION

In accordance with an important feature of the invention, it has been determined that the simplest type of plates of ordinary glass, having a reasonable degree of surface flatness, may be employed for making precision pressure transducers.

From an overall standpoint, a number of features go into the resultant product, and many of these features cooperate in the resultant relatively low cost, high precision pressure transducer. The use of some but not all of the inter-related and mutually cooperating features will yield some of the advantages of the invention. These features include the following:

1. The use of a pair of low cost plates of glass, of square hexagonal, or generally round configuration, for the transducer.

2. Mounting the two plates of glass adjacent to one another but spaced apart, and offset to expose the inner surface of each plate and so that each plate extends past the edge or edges of the other; and in the case of square plates, with the centers of the two plates aligned, but with the corners rotated or displaced from alignment so that each corner of each of the square plates of glass extends beyond the side of the other plate.

3. Forming thin layers of metal on the facing surfaces of the two plates of glass to thereby form a capacitor, and bringing the electrical connections for the capacitor plates out to the exposed inner surfaces, such as the corners of the square plates of glass, for easy connection.

4. Using conductive rubber studs or feedthrough contacts for engaging the conductive material at the exposed areas, such as the corners of the glass plates, thereby providing electrical access to the variable capacitor by reliable contacts which do not interfere with the mechanical properties of the transducer.

5. Providing the sealing and spacing between the two glass plates by the use of glass frit having a melting point which is less than the strain point of the glass which is being employed. A ring of frit extends around the outer periphery of the conductive coatings and is provided with a small break in continuity to permit evacuation and appropriate backfilling, and the associated advantages as set forth in U.S. Pat. No. 4,151,578, granted Aug. 1, 1977, and assigned to the assignee of the present invention.

6. The gap in the ring of glass frit which seals and spaces the square plates may be closed after the desired evacuation and backfilling, if any, by the melting of a glass bead to seal the break in the ring. This may be accomplished, for example, by localized heating.

7. Alternatively, each plate may be separately screened with a circular ring of frit and fired to provide separately pre-glazed matching rings on each plate. Subsequently the two plates are properly placed on top of one-another in a vacuum chamber to join and seal the two parts by heating while the desired gas pressure is present in the chamber.

8. The use of inner resilient mounting gaskets, which may for example be made of silicone rubber, to mechanically float the pair of glass plates against shock while concurrently permitting the application of pressure to both sides of the pair of plates. In one embodiment, O-rings are employed.

9. The use of a ceramic substrate or support assembly of the same general configuration as the sensor elements for carrying the electronic output circuitry for the transducer and also for mounting the contact clips to which the resilient feed-through contacts connect.

10. Utilizing a high strength plastic casing provided with electrostatic shielding, so that a separate inner metal container is not required. The electrostatic shielding may be provided by the use of a vapor deposited conductive coating, such as nickel, on the inside or the outside of the housing, or suitable conductive material may be included within the composition of the plastic itself, either in terms of a particulate or fiber-type conductive filler.

11. It is preferable that the glass plate to which the greater number of electrical connections are to be made be spaced further away from the electronic circuit, and aligned therewith, to facilitate the greater number of electrical contacts which are to be made to the exposed areas such as the corners where the electrically conductive coatings extend.

12. The glass frit may be either of a single glass composition or may contain some higher melting point particles to more readily determine the spacing between the glass plates. When a single type of glass is employed in the frit, three standoff points may be provided around the circumference of the desired location of the frit seal through the use of three standoff elements which may, for example, be screened to the approximate thickness desired for the spacing between the glass plates. These standoff points may be metallic and may be fired in place.

13. Apertures are provided through the silicone gaskets for the feed-through resilient conductors, so that, if desired, the pressure of a conductive medium may be safely measured without short circuiting the output signals from the transducer.

14. As an alternative, the glass plates may be etched to provide the desired spacing of the capacitor plates.

15. In accordance with one aspect of the invention the paths for the application of pressure to the two sides of the transducer are identical, thereby providing improved response characteristics.

Advantages of the new construction as compared with the prior arrangements which have been proposed include the greatly reduced costs of the new design as compared with previously proposed arrangements. By way of one specific example, the cost of both of the two square plates of soda lime glass is only about one-tenth or one-twentieth the cost of the two aluminum oxide ceramic disks which were previously employed. In addition to saving money by using square plates instead of circular disks, with the consequent reduction in cost of material and grinding, the exposed corners of the square plates make for easy connection to the conductive layers which extend to these corners. Another advantage involves the possibility of inspecting the glass frit seal. As it is clearly visible through the glass plates, its integrity may be readily verified visually, something which is not possible with the opaque aluminum oxide disks. In the prior arrangements, it was considered desirable to have one the disks be relatively thicker and inflexible, and bring the electrical leads out through it. This had the undesired effect of reducing sensitivity, as only one of the two elements would flex. In the new design, however, pressure is applied to both of the two plates, and both act as flexing diaphragms, thus increasing sensitivity. The electrical contacts are accomplished efficiently by the use of the conductive rubber contacts, avoiding the need to make secure and rigid electrical connections to the flexing plates. Also, the need for providing holes through one of the plates which were previously provided through the thicker ceramic disk for evacuation and backfilling, and for making electrical connections has been avoided in accordance with the new processes, as set forth in some detail in the foregoing, numbered paragraphs 5 through 7.

Other objects, features and advantages of the invention will become apparent from a consideration of the following detailed description and from the accompanying drawings.

BRIEF DESCRIPTION OF THE DRAWINGS

FIG. 1 is an exploded view of a precision pressure transducer illustrating the principles of the invention;

FIG. 2 is a cross-sectional view of the transducer of FIG. 1 in its fully assembled state;

FIGS. 3 and 4 are top and side views, respectively, of the unit of FIGS. 1 and 2;

FIG. 5 is a top view of the important pressure transducer subassembly, including two glass plates overlying one another;

FIGS. 6 and 7 are views of the top and the bottom plates, respectively showing the conductive layers on the plates;

FIG. 8 is a view showing the conductive pattern on an alternative embodiment of the invention;

DETAILED DESCRIPTION

Figure 9:
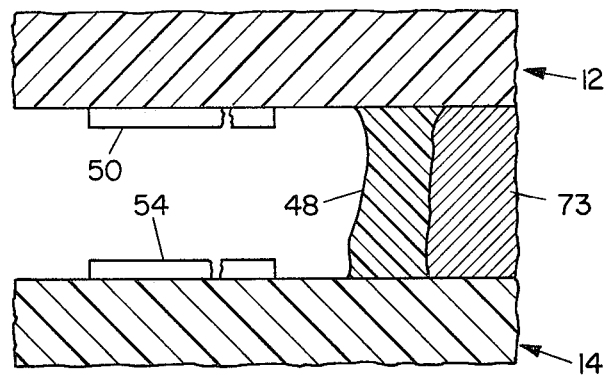
FIG. 9 is a schematic showing indicating generally the configuration of the conductive layers and the glass frit between the two glass plates.

Referring more particularly to the drawings, FIG. 1 is an exploded view of a low-cost precision pressure transducer, illustrating the principles of the present invention. The key elements of the design are the two glass plates 12 and 14, with exposed inner surfaces. As mentioned above, these may be made of relatively inexpensive soda lime glass, with of the two square elements being very inexpensive. The only requirement of significance is the need to have the surface of the glass relatively flat as to total deviation of flatness and camber. This tolerance is preferably less than plus or minus one ten thousandth of an inch. This glass has a "strain point" of about 511 degrees C., and the significance of this figure is that manufacturing operations or method steps should preferably not exceed this temperature, in order to avoid thermal effects which could impair the surface flatness.

Returning to FIG. 1, on either side of the assembly of square plates 12, 14 are the inert resilient gaskets 16 and 18. These gaskets mechanically float and cushion the sensor unit 12, 14, from vibration and possible damage in heavy duty applications, and also are provided with apertures which expose both sides of the sensor unit 12, 14 to the input pressure to be measured, particularly in view of the extensions of the openings 20, which go beyond the edges of the unit 12, 14.

Two high strength plastic housing members 22 and 24 are mounted on opposite sides of the gaskets 16 and 18, and a third high strength plastic cover member 26 is also provided to complete the casing. Between the housing members 24 and 26 are the hybrid assembly 28, providing output electronics for the sensor and a third, rear resilient gasket 30 for providing cushioning support for the ceramic substrate 28. Also shown in FIG. 1 are the connector terminals 32, which may be directly clipped onto the ceramic substrate 28, or may be otherwise connected in place. The connector housing 34 receives the electrical terminals 32, and this housing 34 is securely attached to the rear cover 26. The feed-through electrical connectors or contacts 36 serve to make electrical contact between the sensor 12, 14 and the output electronic hybrid assembly 28. The electrical connectors 26 make direct connection with the conductive layers extending to the corners of the glass plate 14, on its surface facing glass plate 12, and these electrical connectors 36 will also directly engage the contact clips 38 on the ceramic substrate 28. Electrical contact to the plate 12 is accomplished through the use of the contact clip 40 which connects the conductive layer on the inner surface of the glass plate 12 to the other side of plate 12 where it can be engaged by one of the feed-through contacts 36. Incidentally, with the ceramic substrate 28 being of substantially the same square dimensions as the glass plate 14, and oriented with it, three of the contacts 38 are directly in line with the exposed corners of plate 14. The contact clip mounted at the center of one side of the chip 28 extends outwardly to some extent in order to permit contact through one of the feed-through connectors 36 to the contact clip 40.

The fitting 44 which extends axially from the housing member 22, is intended to receive a conduit connection to the medium of which the pressure is to be measured.

in the case of automotive applications it could be a vacuum tube fitting or a connection to another zone where the pressure is to be measured. Normally, for automotive applications, more than one sensor is employed.

FIGS. 2, 3 and 4 are a cross-sectional view, a top view, and a side view, respectively, of the unit shown in exploded form in FIG. 1. The same reference numerals are employed in FIGS. 2, 3 and 4 as in FIG. 1, and accordingly, there is little required explanation. The mode of interconnection of the sensor unit 12, 14, with the hybrid unit 28 may be readily observed from a consideration of the cross-sectional view of FIG. 2. Through the use of the resilient feed-through connectors, the sensor unit is permitted to flex without providing problems of broken connections through continual flexing, relative to metallic conductors affixed to the plates 12, 14, which might otherwise have to be employed.

FIG. 5 of the drawings shows the transducer assembly 12, 14, in somewhat greater detail. Specifically, the view of FIG. 5 is taken from the upper left in FIG. 1, with the square glass plate 12 covering the plate 14. In FIG. 5, the contact clip 40, which is also shown in FIG. 1, is visible, and serves to connect the conductive pattern on the inner surface of plate 12, to one of the feed-through resilient connectors 36. In FIG. 5 the ring of frit 48 is shown interrupted at point 50, for purposes of evacuation and backfilling, and is also shown sealed with a bead of glass 51 which is supplied by localized heating toward the completion of the subassembly.

FIGS. 6 and 7 are showings of the individual glass plates 12 and 14, and the conductive coatings which are fired onto them. The conductive coating 50 on the plate 12, is the simpler of the two, and is made up of a single, generally circular pattern of conductive material which extends to one of the corners of the plate 12 by the extended conductive layer 52. It is this layer 52 which is contacted by the conductive clip 40.

FIG. 7 shows a somewhat more complex pattern which may appear on the plate 14. More specifically, it includes the central conductive layer 54 with its extended portion 56 leading to one of the corners of the square plate 14, and the guard ring 58 with its associated extended portion 60, leading to another corner of the plate 14. If desired, the plate 50 may be provided with thin non-conductive regions to produce a fringing effect, as discussed in U.S. Pat. No. 4,158,217, granted June 12, 1979, and assigned to the assignee of this invention.

In some cases, for improved linearity, or other purposes, and as explained in greater detail in U.S. patent application Ser. No. 072,016, filed Sept. 4, 1979, and assigned to the assignee of this patent application, it is desirable to have more capacitive plates. One such arrangement, including the main variable capacitor 62, the smaller compensating capacitor 64, and the guard ring structure 66, is shown in FIG. 8 with the foregoing conductive patterns being mounted on the plate designated 14-1. The conductive layers included in FIG. 8 are brought out to the terminals 68, 70 and 72, respectively, at the corners of the glass plate 14-1. The arrangements shown in FIG. 1 permit the connection of a number of leads from the transducer unit 12, 14 up to the output electronics included on the ceramic substrate 28. Incidentally, one example of suitable output circuitry is disclosed in the above-identified U.S. patent application Ser. No. 072,016.

FIG. 9 is a diagrammatic showing intended to indicate schematically the general order of the dimensions which are involved. Initially, the plates 12 and 14 may be of any desired dimensions, with glass plates 1½ inches square and 40 thousandths of an inch in thickness having been successfully tested. Preferred dimensions are in the order of less than an inch, for example, approximately 0.90 inch square, and a thickness substantially less than 40 thousandths of an inch, preferably in the order of 20 thousandths of an inch being presently preferred. Referring to FIG. 9, the spacing between the plates 12 and 14 is preferably in the order of one or two thousandths of an inch, and the conductive layers 50 and 54 are preferably in the order of one to one-and one-half ten thousandths of an inch in thickness.

In order to obtain the desired uniform spacing of capacitor plates in successive transducers, various techniques may be employed. For example, a mixture of two glass frits of different melting points has been employed, with the size of the powder in the higher melting point glass frit serving to determine the spacing. Alternatively, sets of three standoff points as schematically indicated at 73 in FIG. 9, may be employed. These may be in the form of three dots or raised fired metallic areas included at the outer periphery of the glass frit ring 48. As mentioned above, the overall spacing between the two glass plates may range from a fraction of a thousandth of an inch to several thousandths of an inch, and the thickness of the conductive layer is preferably in the order of less than two-ten thousandths of an inch, with about one ten thousandth of an inch having proved satisfactory.

Many techniques may be employed to secure the conductive layer to the glass plates, and a number of different types of conductive layers may be used. Similarly, the material used for the glass frit ring and for the standoffs is optional. In general, however, it is important to schedule the method steps to avoid impairment of the flatness of the two glass plates. By way of one specific example, as noted above, the strain point for the soda lime glass which is used is 511 degrees C. A glass frit is employed which has a relatively low melting temperature of between 450 degrees C. and 510 degrees C., below the strain point of 511 degrees C., mentioned hereinabove, and which has substantially the same thermal expansion characteristics as the glass. Concerning the conductive layer, they have been successfully applied by screening of suitable mixtures of powdered palladium, silver and gold in a suitable organic binder onto the glass and subsequently the firing the plates at about 500 degrees C. The palladium silver is principally silver powder with small amounts of palladium powder to avoid oxidation. The palladium—silver powder is mixed at a ratio of approximately six to one with the gold powder. These materials are employed in paste form in a suitable organic carrier which permits them to be applied to the glass plates by a silk screen type process. As mentioned above, they are then fired at about 500 degrees C. to drive off the carrier and to leave the conductive coating, which has a silver appearance.

Concerning the high strength plastic material of which parts 22, 24 and 26 are formed, they may be made of a 30 percent glass filled polyester. Many other plastic materials of high strength and good mechanical and other properties could be used; and a metal housing could also be employed to provide both support and electrical shielding.

Incidentally, the use of the insulating silicone rubber gaskets 16 and 18, to mechanically float the sensor assembly 12, 14, and to enclose the conductive rubber lead-ins 36 has a number of advantages. First, the sensor may be made of two thin glass plates, both of which flex to a substantial degree, without fear of "work" hardening and subsequent breaking of the electrical connections, which could easily occur with firmly connected metallic lead-ins. Also, the full floating of the sensor on the rubber gaskets, precludes mechanical damage to the two plates as they both flex. Further, the embedding of the conductive rubber "feed through" contacts 36 in the gaskets 16, 18 permits the measuring of the pressure of conductive media, including fluids, liquids or gases, without short-circuiting of the electrical signals.

Figure 10:
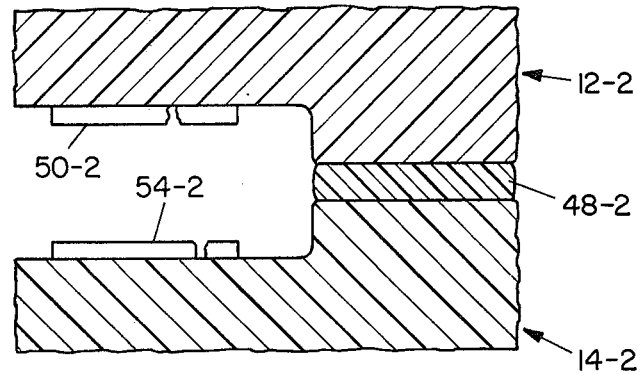
FIG. 10 is a schematic showing of an alternative arrangement in which the conductive plates are spaced by etching the inner surfaces of the glass plates.

FIG. 10 shows an alternative embodiment of the invention in which the spacing of the conductive layers 50-2 and 54-2 is accomplished by etching the glass plates 12-2 and 14-2, with the plates being secured together by a thinner layer of glass frit 48-2. To simplify the process, the etching may be accomplished on only one of the glass plates instead of on both of them.

Figure 11:
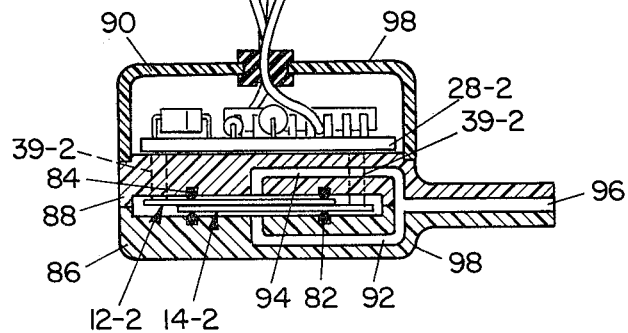

FIG. 11 shows another alternative embodiment, which includes two O-rings 82 and 84 for supporting the transducer made up of the two glass plates 12-2 and 14-2. Electrical connections to the electronic output circuit 28-2 may be accomplished by the conductive rubber feed-through elements 39-2. The outer housing and support for the unit includes three high strength plastic members 86, 88 and 90. The two branch pressure channels 92 and 94 are of equal length and are supplied by the input pressure conduit 96. With this symmetrical arrangement for applying pressure to the two glass plates 12-2 and 14-2, the response to changes in pressure is more rapid, and greater resolution of high speed pressure variations is possible.

For completeness, it is noted that the outer surface of the unit may be entirely coated with a thin layer of conductive material, and this may be accomplished by a spray painting, by electrode-less deposition or any other desired process, for electrical shielding. If desired, an inner conductive coating could be used in place of the exterior coating. The leads 100 are the output leads from the electronic output chip 28-2.

In conclusion, it is to be understood that the specific embodiments disclosed herein have and shown in the drawings are illustrative of the principles of the invention. Various changes and modifications may be made without departing from the spirit and scope of the present invention. For example, for somewhat higher pressure ranges than that normally encountered in the automotive field, thicker elements could be employed. Instead of using a contact clip, such as clip 40 on plate 12, the conductive rubber feedthrough contacts could be notched and extend to both sides of the units; other geometric configurations, such as the use of a square plate and a circular plate, or hexagonal configurations, or notched circular plates could be employed to achieve the same or similar results as those disclosed herein; the space between the glass plates may be open to the atmosphere, through a filter or the like, to measure gauge pressure; and other glasses such as borosilicate glass could be employed instead of soda lime glass. Accordingly, the present invention is not limited to that precisely as shown in the present specification and drawings.

What is claimed is:

1. A mechanically floated precision low cost pressure transducer comprising:
   first and second thin non-circular plates of glass;
   frit means for bonding said plates of glass together with said two plates being generally aligned but with exposed areas of each of said first and second plates extending past the edges of the other plate and said plates being spaced apart by a distance in the order of one-half to a few thousandths of an inch, said frit extending substantially around a central open area of said plates;
   conductive coatings on the adjacent opposed surfaces of said respective plates of glass, forming a capacitor which is variable in accordance with pressure applied to the exterior surfaces of said plates, said conductive coating extending to exposed areas of said plates;
   resilient means for mounting said first and second glass plates and for concurrently applying pressure from a medium of which the pressure is to be measured to the outer surfaces of both said first and second plates, whereby the capacitance of said capacitor varies in accordance with the variations in the applied pressure of said medium;
   associated output electronic circuitry; and
   resilient conductive elements interconnecting said output circuitry and conductive material on the exposed areas of said plates.

2. A transducer as defined in claim 1 including housing means for both mechanically supporting and also conductively shielding said pressure transducer.

3. A transducer as defined in claim 1 including inert, insulating resilient gaskets mounted on both sides of said bonded plates of glass.

4. A transducer as defined in claim 1 wherein said conductive elements extend through said insulating resilient gaskets, whereby the pressure of a conductive medium may be measured.

5. A transducer as defined in claim 1 wherein said resilient conductive elements are made of conductive rubber.

6. A transducer as defined in claim 1 wherein said resilient means includes a pair of O-rings.

7. A transducer as defined in claim 1 including paths of substantially equal length for applying pressure to said first and second glass plates.

8. A precision low cost pressure transducer comprising:
   first and second thin square flat plates of glass;
   frit means for bonding said plates of glass together with said two plates being substantially overlapping with the corners of each of said first and second plates being offset relative to one another to extend past the edges of the other, and said plates being spaced apart by in the order of one-half to a few thousandths of an inch, said frit extending substantially around the overlapping area of said plates;
   conductive coatings on the adjacent opposed surfaces of the respective plates of glass, forming a capacitor which is variable in accordance with pressure applied to the exterior surfaces of said plates, said conductive coatings extending to exposed corners of said plates;
   means for mounting and enclosing said first and second glass plates to concurrently apply pressure from a medium of which the pressure is to be measured to the outer surfaces of both said first and second plates, whereby changes in the capacitance of said capacitor accurately indicates the applied pressure of said medium;

a square output electronic substrate or assembly mounted in alignment with one of said plates of glass; and resilient conductive elements interconnecting said electronic assembly and the conductive coating on the exposed corners of said plates.

9. A precision low cost pressure transducer comprising:

first and second thin square flat plates of glass;

frit means for bonding said plates of glass together with said two plates being substantially overlapping with the corners of each of said first and second plates being offset relative to one another to extend past the edges of the other, and said plates being spaced apart by in the order of one-half to a few thousandths of an inch, said frit extending substantially around the overlapping area of said plates;

conductive coatings on the adjacent opposed surfaces of the respective plates of glass, forming a capacitor which is variable in accordance with pressure applied to the exterior surfaces of said plates, said conductive coatings extending to exposed corners of said plates;

means for mounting and enclosing said first and second glass plates to concurrently apply pressure from a medium of which the pressure is to be measured to the outer surfaces of both said first and second plates, whereby changes in the capacitance of said capacitor accurately indicates the applied pressure of said medium; and conductive rubber means engaging conductive material on the corners of each of said plates which extend past the edges of the other plate.

10. A precision low cost pressure transducer comprising:

first and second thin square flat plates of glass;

frit means for bonding said plates of glass together with said two plates being substantially overlapping with the corners of each of said first and second plates being offset relative to one another to extend past the edges of the other, and said plates being spaced apart by in the order of one-half to a few thousandths of an inch, said frit extending substantially around the overlapping area of said plates;

conductive coatings on the adjacent opposed surfaces of the respective plates of glass, forming a capacitor which is variable in accordance with pressure applied to the exterior surfaces of said plates, said conductive coatings extending to exposed corners of said plates;

means for mounting and enclosing said first and second glass plates to concurrently apply pressure from a medium of which the pressure is to be measured to the outer surfaces of both said first and second plates, whereby changes in the capacitance of said capacitor accurately indicates the applied pressure of said medium;

said glass frit being in the form of a ring, having a small break in its peripheral extent for evacuation and backfilling; and means for sealing said break in the ring of frit to completely seal the space between said plates.

11. A precision low cost pressure transducer comprising:

first and second thin flat plates of inexpensive glass;

glass sealing means for bonding said plates of glass together with the edges of at least one of said plates extending past the other, and said plates being spaced apart by in the order of one-half to a few thousandths of an inch, said glass sealing means extending substantially around the overlapping area of said plates;

conductive coatings on the adjacent opposed surfaces of the respective plates of glass, forming a capacitor which is variable in accordance with pressure applied to the exterior surfaces of said plates, said conductive coatings extending to exposed surfaces of at least one of said plates extending beyond the other plate;

means including a pair of O-rings for resiliently mounting said first and second glass plates and for applying pressure from a medium of which the pressure is to be measured to the outer surfaces of at least one of said plates, whereby changes in the capacitance of said capacitor correspond to changes of the applied pressure of said medium;

an output electronic assembly mounted in substantial alignment with said plates of glass; and nonmetallic resilient conductive elements interconnecting said assembly and conductive material on the exposed surfaces of said glass plates.

* * * * *